No. 607,980. Patented July 26, 1898.
C. W. H. BLOOD.
SELF OILING BEARING.
(Application filed Apr. 1, 1898.)
(No Model.)
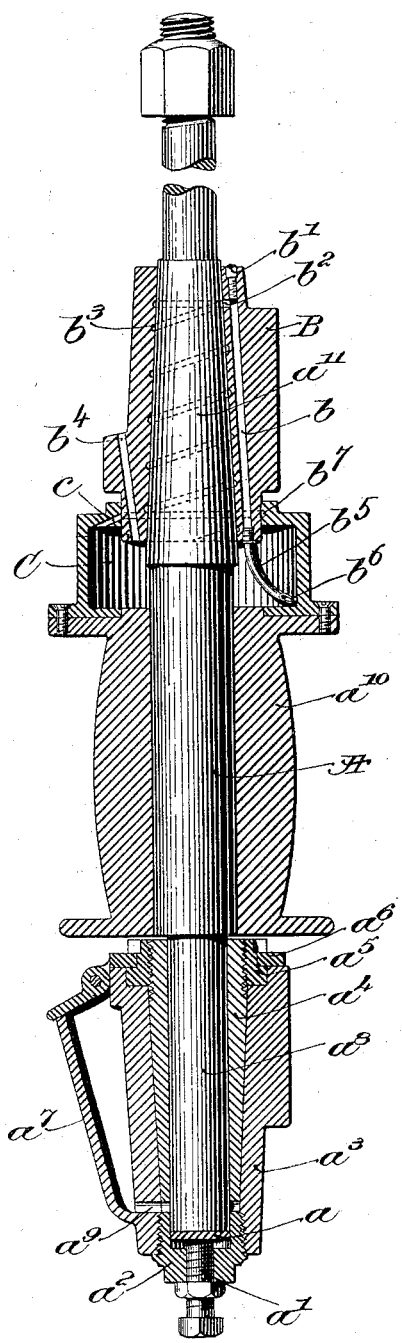
Witnesses
Edward F. Allen.
Fred S. Greenleaf.
Inventor:
Charles W. H. Blood.
By Crosby Gregory.
attys.

UNITED STATES PATENT OFFICE.

CHARLES W. H. BLOOD, OF BOSTON, MASSACHUSETTS, ASSIGNOR TO THE S. A. WOODS MACHINE COMPANY, OF SAME PLACE.

SELF-OILING BEARING.

SPECIFICATION forming part of Letters Patent No. 607,980, dated July 26, 1898.

Application filed April 1, 1898. Serial No. 676,033. (No model.)

*To all whom it may concern:*

Be it known that I, CHARLES W. H. BLOOD, of Boston, county of Suffolk, and State of Massachusetts, have invented an Improvement in Self-Oiling Bearings, of which the following description, in connection with the accompanying drawing, is a specification, like letters on the drawing representing like parts.

My invention is an improvement in automatic oilers for vertical shafts, being particularly intended for high-speed spindles or shafts, such as the cutter-spindles of wood planers and matchers, although it will be understood that my invention is adapted for various other relations and for use in a wide range of machines.

In general my invention may be said to comprise a stationary bearing or housing for the vertical shaft, containing adjacent said shaft a conduit or recess for the passage of the oil or lubricant and a connecting passage or channel from the lower end of said bearing to the top of said internal conduit or conduits, said passage being provided at its lower end with a filler or scoop-like supply-pipe projecting into an oil chamber or reservoir rotating with said shaft, so that when the shaft and chamber rotate the oil will be caught by said supply-pipe and automatically driven therethrough to the conduits to fall by gravity or be driven again into the chamber after having lubricated the journal-bearing shaft.

The details of construction of my invention will be more fully pointed out in the course of the following description, reference being had to the accompanying drawing, and the invention will be more particularly defined in the appended claims, also forming a part of this specification.

In the drawing I have shown a central vertical sectional view of my invention in connection with a high-speed driving-pulley.

The vertical or substantially vertical shaft A, supported at its lower end by a foot-step $a$, herein shown as adjustable by means of a screw-bolt $a'$ in a bearing-nut $a^2$, carried by a casting $a^3$, may be of any usual or preferred form. I have herein shown the casting $a^3$ as also provided with a bearing-sleeve $a^4$, properly supported therein by a nut $a^5$ and a retaining-ring $a^6$, and I have also provided an oil-cup $a^7$, supplying proper lubricant to the reduced end $a^8$ of the shaft through an oil-hole $a^9$. Above the lower bearing thus described a usual pulley $a^{10}$ is herein shown for convenience of illustration as being carried by the shaft for driving the same, although it will be understood that the shaft may be driven by any other means or in any other place in its length.

The upper bearing B is properly recessed to receive the shaft, the latter being herein shown as conical in form at $a^{11}$. This bearing contains a channel or connecting-passage $b$, shown as stopped at its upper end by a throttle plug or pin $b'$ and connecting thereat with an annular recess or conduit $b^2$, communicating with a spiral passage or conduit $b^3$, winding down about the shaft in the direction of rotation of the latter. This is the preferred arrangement of the conduit, although it will be understood that the ducts or passages forming the conduit may be arranged in any manner desired, and they may be continuous or interrupted, it being the purpose of this feature of the device, broadly considered, to provide a proper directing-passage for the lubricant, which is delivered to the bearing through the channel $b$. The bearing is also preferably provided with a filling hole or conduit $b^4$, through which the oil may be poured and which also acts as an air-vent to aid the free operation of the device.

Secured to the shaft so as to rotate therewith is a chamber or oil-reservoir C, herein shown as fast on the pulley $a^{10}$, although it may be mounted in any other connection, provided it is free to rotate with the shaft. Within this reservoir I provide a filler or supply-pipe $b^5$, bent or otherwise formed so as to present its mouth $b^6$ opposed to the movement of the revolving oil or lubricant. By the term "pipe" I mean any form of device to form a directing-path for the oil to follow to the channel $b$. I have shown the mouth of the supply-pipe as terminating in the lower outer corner of the oil well or reservoir C, although it will be understood that it may be located at any point adjacent the outer wall of the reservoir, so as to catch the oil held by centrifugal force against said wall as the chamber is rapidly rotated by the shaft or pulley.

In operation as the shaft and oil-chamber are rapidly rotated to the right the oil contained in the reservoir or chamber C is correspondingly whirled round in the same direction and brought into forcible contact against the mouth of the supply-pipe $b^5$, so that a constant stream of oil is forced under considerable pressure up through the passage $b$ into the conduits $b^2 b^3$. However, inasmuch as the shaft revolves at a very high speed the oil is forced under such pressure that I have found in practice that notwithstanding the exceedingly perfect fit of the conical bearing the unrestricted oil-pressure from the passage $b$ would be such as to force the oil through faster than it could be taken care of in the conduit $b^3$, and thereby cause it to be driven out at the top of the bearing. Accordingly I have inserted the throttle-pin $b'$, as shown, and by adjusting this pin to a degree just sufficient to stop the escape of oil at the top of the shaft the latter is perfectly lubricated. This feature of my invention is of great practical importance in this device.

A further object had in view is the provision of an absolutely tight joint to prevent the escape of oil at the lower end of the bearing B, for it will be readily understood that the stationary supply-pipe $b^5$, projecting down into the rapidly-revolving body of oil, tends to drive the oil with considerable force against the top of the chamber and against the adjacent joint. I provide this tight joint by giving the adjacent end of the bearing B a concentric annular outer surface and preferably making the contacting surfaces of considerable width, as shown, by providing in one of them, herein shown as the moving surface, an annular groove or conduit $b^7$, which registers or is provided with one or more inclined ducts $c$, leading back into the oil-chamber. The result is that whatever oil may be forced into the joint is caught by the conduit $b^7$ and whirled therefrom by centrifugal action back into the oil-chamber, thereby not only making a lubricated joint at this point, but absolutely preventing the escape of the oil. This feature, taken in connection with the automatic oiling features of the main bearing, constitutes a perfectly-lubricated and yet absolutely neat and close bearing for the shaft. Whatever vacuum might otherwise be produced by the centrifugal action of the oil within the oil-chamber is prevented by the air-vent $b^4$, through which also a proper supply of oil may be provided, as stated.

The embodiment of my invention herein shown is merely one of many embodiments thereof; because of the impelling action of my apparatus above referred to it is capable of use with horizontal or inclined shafting, the close joint and formation of the upper end of the oil-chamber also especially adapting the device to such use by preventing any escape of oil thereat.

Having fully described my invention, what I claim, and desire to secure by Letters Patent, is—

1. The combination with a rotatable shaft and its bearing, of an oil-chamber connected to rotate with said shaft, an oil-supply pipe in said bearing, said pipe having a mouth at its lower end opening against the movement of the oil in said chamber and terminating at its upper end short of the upper end of the bearing and adjacent the journal-surface of the shaft, the adjacent surface of the bearing having an annular recess or conduit at the said upper termination of the oil-supply pipe, said annular conduit communicating with a spiral conduit about the shaft extending toward the oil-chamber in the direction of rotation of the shaft, substantially as described.

2. The combination with a bearing and a shaft mounted therein, of an oil-chamber embracing the shaft and fixed thereto, an oil-conduit in the inner bearing-surface of said bearing, said conduit being closed at its upper end and freely open thence downward to the oil-chamber, and an oil-supply passage and pipe connecting said conduit with said chamber and being otherwise closed against the escape of oil, substantially as described.

3. The combination with a bearing, a shaft journaled therein, an oil-chamber embracing the shaft and rotating therewith, a conduit for the passage of oil to lubricate the shaft, said conduit being closed at its upper end and extending spirally about the shaft toward the oil-chamber in the direction of rotation of the shaft, and a supply-pipe connecting with the farther end of said conduit and having a mouth opening against the movement of the oil in said chamber, substantially as described.

4. The combination with a rotatable shaft and its bearing, of an oil-chamber connected to rotate with said shaft, said bearing being provided with an internal channel forming a connecting-passage between the bearing-surface thereof and said chamber, and a supply-pipe having a mouth opening against the movement of the oil in said chamber, and a throttle-pin for regulating the flow of oil in said passage, substantially as described.

5. In a self-oiling bearing for a shaft, a conduit for the oil, an oil-supply, automatic means for driving the oil from said supply through said conduit, and means for regulating the flow of oil as desired, substantially as described.

6. A bearing for a shaft, said bearing having at one end a concentric outer surface, an oil-chamber having its open end fitted to said outer surface and rotatable thereon, there being an annular groove in one of said contacting surfaces, and a duct leading from said groove back into the oil-chamber, substantially as described.

In testimony whereof I have signed my name to this specification in the presence of two subscribing witnesses.

CHAS. W. H. BLOOD.

Witnesses:
 GEO. H. MAXWELL,
 FREDERICK L. EMERY.